United States Patent
Li et al.

(10) Patent No.: US 8,571,422 B2
(45) Date of Patent: Oct. 29, 2013

(54) BURST TRANSMISSION METHOD, AND RECEIVER RESETTING METHOD AND APPARATUS IN A PASSIVE OPTICAL NETWORK

(75) Inventors: Jing Li, Shenzhen (CN); Dongning Feng, Shenzhen (CN); Dongyu Geng, Shenzhen (CN); Frank Effenberger, Bridgewater, NJ (US)

(73) Assignee: Huawei Technologies Co., Ltd., Shenzhen (CN)

( * ) Notice: Subject to any disclaimer, the term of this patent is extended or adjusted under 35 U.S.C. 154(b) by 89 days.

(21) Appl. No.: 13/210,848

(22) Filed: Aug. 16, 2011

(65) Prior Publication Data
US 2011/0311235 A1    Dec. 22, 2011

Related U.S. Application Data

(63) Continuation of application No. PCT/CN2009/070441, filed on Feb. 16, 2009.

(51) Int. Cl.
*H04B 10/06*    (2011.01)

(52) U.S. Cl.
USPC ............ 398/202; 398/208; 398/66; 398/68; 398/71; 398/72; 398/154; 398/155; 398/135; 398/136; 398/98; 398/99; 398/100; 398/74; 398/75; 370/352; 370/392; 370/389; 370/468; 370/395.51

(58) Field of Classification Search
USPC ......... 398/202, 208, 209, 214, 135, 136, 137, 398/138, 139, 66, 67, 68, 70, 71, 72, 74, 75, 398/79, 98, 99, 100, 154, 155, 158, 159; 370/352, 392, 389, 468, 401, 465, 370/395.31, 395.51
See application file for complete search history.

(56) References Cited

U.S. PATENT DOCUMENTS

| 6,592,272 | B1 | 7/2003 | Masucci et al. |
| 6,891,881 | B2 * | 5/2005 | Trachewsky et al. ......... 375/143 |

(Continued)

FOREIGN PATENT DOCUMENTS

| CN | 1445940 A | 10/2003 |
| CN | 101145848 A | 3/2008 |

(Continued)

OTHER PUBLICATIONS

"Gigabit-capable Passive Optical Networks (GPON): Reach Extension (ex G. 984.re-GPON Optical Reach Extension" International Telecommunication Union—Telecommunication Standardization Sector. Mar. 2008.

(Continued)

*Primary Examiner* — Hanh Phan
(74) *Attorney, Agent, or Firm* — Brinks Hofer Gilson & Lione

(57) ABSTRACT

A burst transmission method and a receiver resetting method and apparatus in a Passive Optical Network (PON) are provided. A burst receiver resetting method in a PON includes: receiving a preamble sequence and synchronizing data; after synchronizing the data, continuing to receive the data, and matching a Burst Terminator (BT); and resetting a receiver after successfully matching the BT. Meanwhile, an apparatus for implementing the method and a corresponding burst data transmission method are provided. By using the burst receiver resetting method and apparatus in the PON and the corresponding burst transmission method at an Optical Network Unit (ONU) burst transmission end, a Reach Extender (RE) does not need to unpack upstream burst bandwidth allocation information carried in downstream data. Therefore, the complexity of the implementation of the RE is reduced, and the method is simple and effective.

8 Claims, 3 Drawing Sheets

(56) References Cited

U.S. PATENT DOCUMENTS

| | | | |
|---|---|---|---|
| 7,548,694 B2* | 6/2009 | Kazawa et al. | 398/67 |
| 2002/0120758 A1* | 8/2002 | Chang | 709/230 |
| 2003/0170032 A1 | 9/2003 | Song et al. | |
| 2003/0206744 A1 | 11/2003 | Doh et al. | |
| 2007/0242676 A1 | 10/2007 | Fridman | |
| 2008/0002973 A1* | 1/2008 | Yamabana et al. | 398/38 |
| 2008/0310861 A1* | 12/2008 | Wong et al. | 398/210 |
| 2009/0010650 A1 | 1/2009 | Tsuchiya et al. | |
| 2009/0052897 A1* | 2/2009 | Kazawa et al. | 398/71 |
| 2010/0111532 A1 | 5/2010 | Chen et al. | |
| 2011/0044699 A1 | 2/2011 | Li et al. | |

FOREIGN PATENT DOCUMENTS

| | | |
|---|---|---|
| CN | 101316142 A | 12/2008 |
| CN | 101364844 A | 2/2009 |
| CN | 101572833 A | 11/2009 |
| EP | 1231813 A2 | 8/2002 |
| EP | 1 791 276 A1 | 11/2006 |
| EP | 2007040 A1 | 12/2008 |

OTHER PUBLICATIONS

International Search Report issued in corresponding PCT Application No. PCT/CN2009/070441; mailed Nov. 19, 2009.

Written Opinion of the International Searching Authority issued in corresponding PCT Application No. PCT/CN2009/070441; mailed Nov. 19, 2009.

Extended European Search Report issued in corresponding European Patent Application No. 09839879.5, mailed Mar. 22, 2012.

Le et al., "A Burst-Mode Receiver for 1.25-Gb/s Ethernet PON With AGC and Internally Created Reset Signal" IEEE Journal of Solid State Circuits, vol. 39, No. 12, Dec. 2004.

Office Action issued in corresponding Chinese Patent Application No. 200980155326.9, mailed Jan. 30, 2013.

Search Report issued in corresponding Chinese Patent Application No. 200980155326.9, mailed Jan. 30, 2013.

Office Action issued in corresponding European Patent Application No. 09839879.5, mailed May 10, 2013, 4 pages.

* cited by examiner

BURST TRANSMISSION METHOD, AND RECEIVER RESETTING METHOD AND APPARATUS IN A PASSIVE OPTICAL NETWORK

CROSS-REFERENCE TO RELATED APPLICATIONS

This application is a continuation of International Application No. PCT/CN2009/070441, filed on Feb. 16, 2009, which is hereby incorporated by reference in its entirety.

FIELD OF THE INVENTION

The present invention relates to the field of Passive Optical Network (PON) technologies, and in particular, to an upstream burst data transmission method, and a receiver resetting method and apparatus in a PON.

BACKGROUND OF THE INVENTION

With advantages such as easy maintenance, high bandwidth, and low cost, the PON plays a leading role in optical access technologies, and is an ideal physical platform comprehensively integrating access of multiple services such as voice, data, and video through a single platform. The PON technology is a Point to Multipoint (P2MP) optical fiber access technology. The PON is formed by an Optical Line Terminal (OLT), an Optical Network Unit (ONU), and an Optical Distribution Network (ODN). The Gigabit-Capable Passive Optical Network (GPON) technology is an important technology branch in the PON family. The GPON supports a Triple-play service and has a full-service access capability, so that the deployment of services is more flexible. The GPON supports high-bandwidth transmission and long-distance access. The GPON has flexible bandwidth allocation, and has perfect maintenance and management capability to ensure the Quality of Service (QoS). The GPON technology is one of the optical access technologies under the greatest concern at present, and will still be the focus in the following 2 to 3 years.

It is stipulated in a PON system that, the direction that data is transmitted from the OLT to the ONU is a downstream direction, and the direction that data transmitted from the ONU to the OLT is an upstream direction. A GPON system adopts a Wavelength Division Multiplexing (WDM) technology to implement single-fiber bi-directional transmission. In order to separate signals of upstream and downstream directions of multiple users in one optical fiber, a downstream data stream adopts a broadcast technology, and an upstream data stream adopts a Time Division Multiple Access (TDMA) technology. In practical network deployment, for scenarios with a longer transmission distance or more users, a Reach Extender (RE) or a similar device needs to be added between the OLT and the ODN, so as to extend a transmission distance from the OLT to an optical splitter/coupler, or increase a branch ratio of the optical splitter/coupler. Upstream data is sent from the ONU to the OLT in a TDMA manner. Each upstream data block sent by the ONU is referred to as a burst, that is, data is sent in the form of burst data packets. As the burst data sent by each ONU is not precisely synchronized in time sequence, and a bit synchronization error exits, a protection time slot of a certain length is maintained between the bursts to avoid collision. Meanwhile, due to particularity of the time sequence of each burst, that is, the bursts are not in complete bit synchronization, a burst receiver needs to perform bit synchronization each time a burst is received. However, before these steps are performed, the burst receiver generally needs to be reset. An Embedded Optical Network Termination for management of the extender (EONT) in the prior art needs to unpack the downstream data to obtain bandwidth allocation information. To unpack and resolve the downstream data is a relatively complex process, which increases the complexity of the implementation of the RE.

SUMMARY OF THE INVENTION

Embodiments of the present invention provide an upstream burst data transmission method in a PON system, which delimits upstream burst data and decreases the complexity.

A burst receiver resetting method in a PON according to an embodiment of the present invention includes:
  receiving a preamble sequence and synchronizing data;
  after the data is synchronized, continuing to receive the data, and matching a Burst Terminator (BT); and
  resetting a receiver after the BT is successfully matched.

Meanwhile, a burst receiver in a PON is provided, which includes:
  a receiving module, configured to receive burst data, where the burst data includes a preamble sequence, a data payload, and a BT;
  a synchronization module, configured to synchronize data according to the received preamble sequence;
  a BT matching module, configured to match a BT; and
  a reset module, configured to reset the receiver after the BT is successfully matched.

Further, an upstream burst transmission method in a PON is provided, which includes:
  sending a Physical Layer Overhead upstream (PLOu), where the PLOu includes a preamble, a delimiter, and a burst header;
  sending an assigned time slot, where the assigned time slot includes a transmission convergence layer frame overhead and a transmission convergence layer frame payload; and
  sending a BT, where the BT is configured to delimit a burst.

The embodiments of the present invention provide the burst receiver resetting method and apparatus in the PON and the corresponding burst transmission method at an ONU burst transmission end. Through the method, to delimit an ending of the burst is realized. Therefore, an RE does not need to unpack upstream burst bandwidth allocation information carried in downstream data, and does not need to calculate a start time and an end time of the upstream burst according to the upstream bandwidth allocation information. As a result, the complexity of the implementation of the RE is reduced, and the method is simple and effective.

DETAILED DESCRIPTION OF THE EMBODIMENTS

The embodiments of the present invention are described in combination with a GPON system, and to delimit an ending of burst data is implemented by adding a BT, which indicates the ending of a burst, at the end of each upstream burst data.

Embodiment 1 provides a specific implementation solution in a case that an RE is deployed in the GPON system.

In the GPON system of this embodiment, a GTC frame is taken as a unit for both an upstream frame and a downstream frame, and each GTC frame is of 125 ms. In this embodiment, the downstream GTC frame includes a GTC frame header, which is a Physical Control Block downstream (PCBd), and a GTC frame payload. For the upstream GTC frames, each GTC frame may include multiple bursts which may come from different ONU transmission ends. As the bursts are sent from different ONUs, an idle protection time slot exists between bursts, and the bursts may not be in complete bit synchronization. In this embodiment, a BT of a specific length is added at the end of each burst, so as to implement resetting of an RE burst receiver.

Figure 1:
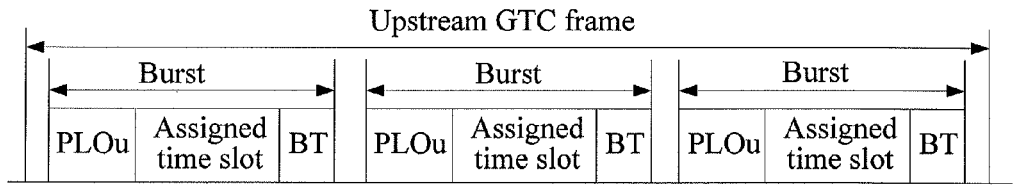
FIG. 1 is a structure diagram of an upstream data burst according to an embodiment of the present invention.

As shown in FIG. 1, an upstream GTC frame structure of the GPON system in this embodiment includes a PLOu, an assigned time slot, and a BT.

Figure 2:
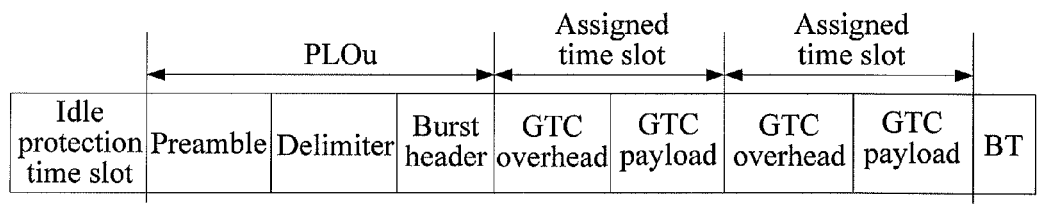
FIG. 2 is a schematic structure diagram of a burst in an upstream GPON Transmission Convergence (GTC) frame structure according to an embodiment of the present invention.

FIG. 2 shows a burst structure in the upstream GTC frame structure. An idle protection time slot of a certain length exits before each burst. Following the idle protection time slot are a preamble, a delimiter, and a burst header in sequence, and the three parts form a PLOu part. The major functions of the PLOu are frame location and synchronization, and indication of an ONU corresponding to the frame. An assigned time slot part following the PLOu part may be formed by multiple small assigned time slots. Each smaller assigned time slot includes a GTC overhead and a GTC payload, where the GTC overhead is a data frame header of a data packet of a GTC framing sub-layer, and includes a Physical Layer Operation Administration Maintenance upstream (PLOAMu) and a Dynamic Bandwidth Report upstream (DBRu). The PLOAMu carries a physical layer operation management and maintenance message of the upstream data, which is mainly used for maintenance and state management of the ONU. The DBRu is mainly used for reporting a current state of a data transmission queue. An OLT accomplishes dynamic bandwidth allocation of each ONU based on DBRu information. In practice, not every small assigned time slot has the PLOAMu and the DBRu, and whether the PLOAMu and the DBRu are sent is determined based on an actual state of the ONU and through negotiation between the OLT and the ONU. The GTC payload is actually a data payload and is the data to be transmitted and carried by the GPON system, and usually adopts a GPON Encapsulation Method (GEM). Finally, at the end of the burst is the BT of a specific length. A specific length and format of the BT may be set according to requirements of a system on reliability of BT matching detection, and the BT may be any special sequence. The BT recommended in Embodiment 1 is a binary sequence with alternating 0 and 1, or a sequence with all 0s. When the BT is a sequence with all 0s, the protection time slot between the burst data being a sequence with all 0s may be used as the BT, and in an application, in order to ensure an adequate length of the BT, the protection time slot between the burst data may be extended correspondingly.

Figure 3:
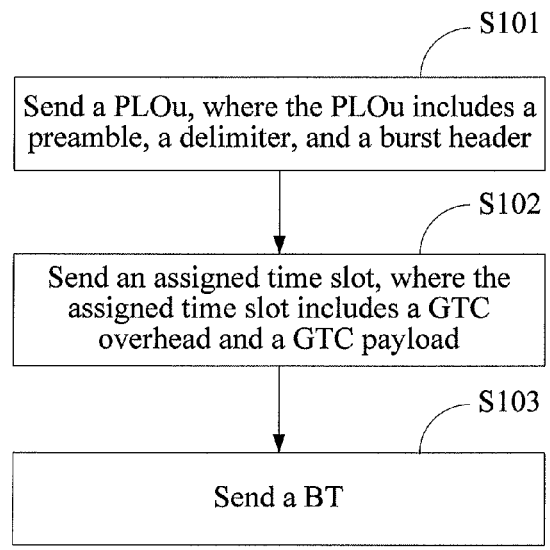
FIG. 3 is a flow chart of an ONU transmission end sending burst data according to an embodiment of the present invention.

Referring to FIG. 3, FIG. 3 is a flow chart of an ONU transmission end sending burst data according to an embodiment of the present invention.

Step S101: Send a PLOu, where the PLOu includes a preamble, a delimiter, and a burst header.

A preamble sequence is sent. Before the preamble sequence is sent, an ONU needs to send the preamble sequence at a negotiated time point according to an allocation result negotiated with an OLT through a bandwidth allocation process in the system or a specified allocation result. The preamble sequence has functions such as data synchronization or clock recovery at a receiving end.

A delimiter sequence for performing burst delimitation is sent, where the delimiter is mainly used for the receiving end to determine a specific start position of the burst.

A burst header sequence is sent, where the sent burst header sequence includes data check information, and information such as an ONU identity.

Step S102: Send an assigned time slot, where the assigned time slot includes a GTC overhead and a GTC payload.

A GTC overhead part is sent. This part of data may include physical layer management and maintenance information, and information such as a state report of bandwidth information.

A GTC payload part formed by data payloads is sent, where the GTC payload part is data to be transmitted and carried by a GPON system.

If multiple assigned time slots exist, that is, multiple sequences formed by the GTC overheads and payloads exist, the step may be repeated.

Step S103: Send a BT. The sent BT may be a sequence with all 0s, or a sequence with alternating 0 and 1. The BT is configured to delimit a burst.

A length of the sent BT may be set according to requirements on system reliability, for example, according to an index such as an average time of occurrence of incorrect matching. A specific length and format of the BT may be set according to requirements of the system on reliability of BT matching detection, and the BT may be any special sequence. The BT recommended in Embodiment 1 is a binary sequence with alternating 0 and 1, or a sequence with all 0s. The BT uses one byte as a unit, that is, the length of the BT is an integral multiple of one byte. When the BT is a sequence with all 0s, a protection time slot between burst data being a sequence with all 0s may be used as the BT, and in an application, in order to ensure an adequate length of the BT, the protection time slot between the bursts may be extended correspondingly.

After the BT is sent, burst data is sent, and the process ends.

According to the burst transmission method at a burst transmission end in this embodiment, the BT is added to delimit the burst. In this way, in subsequent resetting of the receiver, upstream burst bandwidth allocation information carried in downstream data does not need to be unpacked, and the complexity of the whole process is reduced.

After each ONU sends the burst data in an upstream direction, the upstream burst data is coupled to one optical fiber through an optical splitter/a coupler, and is transmitted in a Time Division Multiplexing (TDM) manner. The burst needs to pass through an RE for regeneration and amplification, and is sent to the OLT. During this process, an RE receiver needs to be reset.

Figure 4:
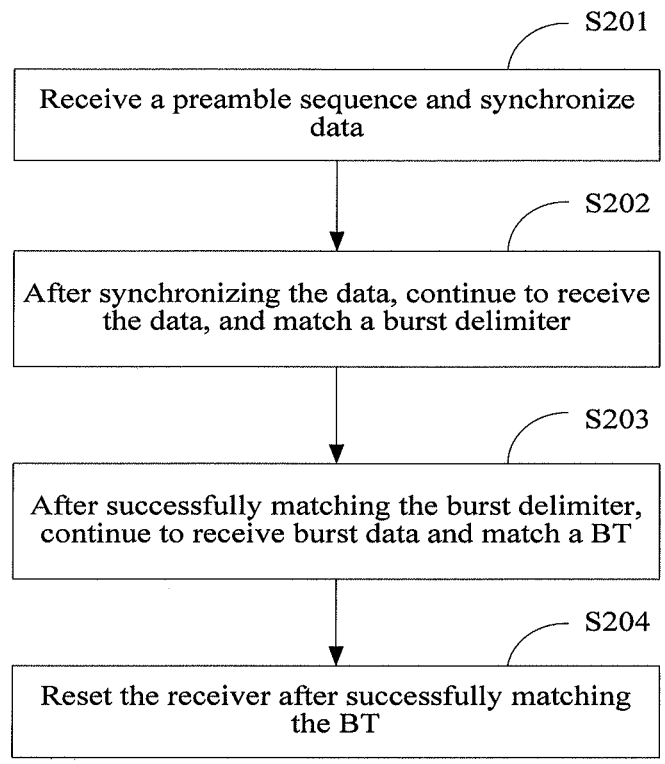
FIG. 4 is a flow chart of burst data receiving and receiver resetting according to an embodiment of the present invention.

A process of burst data receiving and receiver resetting of the RE is as shown in FIG. 4, and the specific steps are described as follows.

When data receiving is started, a system instructs the burst receiver to perform resetting, and the process of receiver resetting is started.

Step S201: Receive a preamble sequence and synchronize data.

Data synchronization herein refers to bit data synchronization. The preamble sequence is generally formed by three parts: a binary sequence with all 0s, a binary sequence with all 1s, and a specific mode sequence, or may only include a specific mode sequence. The specific mode sequence herein usually adopts a binary sequence with alternating 0s and 1s, and may also adopt other sequences that have benefit for clock recovery or bit synchronization.

Step S202: After implementing bit synchronization, continue to receive the data. Match a burst delimiter. The operation for matching the burst delimiter is performed to determine a start position of a burst.

The data that is continuously received herein refers to all data that may be received at a receiving end. The operation for matching the burst delimiter means to match the received data according to a bit shift. When a Hamming distance between the received data and the delimiter is smaller than a certain threshold M, the matching is considered to be successful. The Hamming distance herein refers to the number of positions where bit values are different among all positions of two binary sequences with equal lengths. A value of M is a specific natural number, which may be set according to requirements of a system on matching reliability. For example, the setting of a threshold value may directly influence indexes such as an average time of occurrence of incorrect matching of the burst delimiter. If the matching fails, the data receiving and the delimiter matching operations are repeated; and if the matching is successful, the process proceeds to the next step.

Step S203: After successfully matching the burst delimiter, continue to receive burst data and match a BT.

The data received at this time is a part of data after the delimiter, and includes a burst header and each assigned time slot. The assigned time slots may be multiple, and each small assigned time slot includes a GTC overhead and a GTC payload. The GTC payload is data to be transmitted and carried by a GPON system. A BT part is located at the end.

The operation for matching the BT may be performed according to specific features of the BT. The BT may either be matched according to a bit shift, or be matched based on a shift of a specific length, for example, matched based on a byte shift. That is, when a length of the BT is in combination with features of burst data, for example, data in the GPON uses one byte (8 bits) as a unit, and a value of the length of the BT is a natural number multiple of one byte, the matching may be performed through a shift with one byte as a unit. In this embodiment, the recommended length of the BT uses one byte as a unit, that is, the length of the BT is a natural number multiple of one byte, for example, the length of the BT may be a value such as 64, 96, or 128 bits, and the specific value is a binary sequence with alternating 0s and 1s, or a sequence with all 0s. When a Hamming distance between the data received by the receiving end and the BT is smaller than a threshold N, the matching is considered to be successful. The Hamming distance herein refers to the number of positions where bit values are different among all positions of two binary sequences with equal lengths. A value of N is a specific natural number, and may be set according to requirements of the system on matching reliability. For example, the setting of a threshold value may directly influence indexes such as an average time of occurrence of incorrect matching of the BT. In a practical application, the value of N may be N=12, N=16, or N=18. When the matching fails, the data receiving and BT matching operations are repeated.

Step S204: Reset the receiver after successfully matching the BT.

If the BT is successfully matched, it indicates that the burst receiving is finished, and the receiver is reset.

Further, in the practical application, when an RE performs the burst receiving, the burst receiver may not match the delimiter and only needs to match the BT. The reason lies in that, when the specific format of the BT uses a binary sequence different from the preamble and the delimiter, the BT matching does not need to be started depending on the successful matching of the burst delimiter. However, in Embodiment 1, the binary sequence of alternating 0 and 1 is recommended, and the binary sequence is one of the binary sequences possibly used in the preamble of the current GPON system. If the BT matching is started without depending on the matching of the burst delimiter, the preamble in the burst may be mistakenly regarded as the BT, which leads to incorrect matching and leads to instruct the burst receiver to be reset inappropriately. For example, when the BT is a sequence with all 0s, the BT is matched directly without performing the matching of the delimiter.

Figure 5:
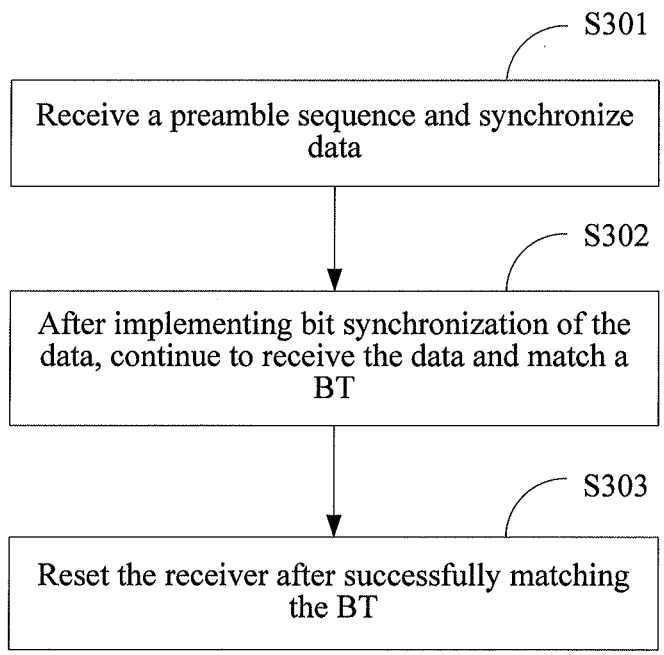
FIG. 5 is a flow chart of burst data receiving and receiver resetting according to another embodiment of the present invention.

Therefore, the embodiment of the present invention further provides another embodiment of burst data receiving and receiver resetting. This embodiment provides a process of data receiving and resetting of an RE burst receiver when a binary sequence different from a preamble or a delimiter is used as a specific value of a BT, for example, the BT is a sequence with all 0s. FIG. 5 shows a flow chart of another embodiment of burst data receiving and receiver resetting.

When data receiving is started, a system instructs the burst receiver to perform resetting, and starts the process of receiver resetting.

Step S301: Receive a preamble sequence and synchronize data.

Step S302: After synchronizing the data, continue to receive the data and match a BT.

The data is received after the data is synchronized, and meanwhile, BT search and matching is performed on the received data. A specific matching method is the same as the BT matching method described in Embodiment 1. When the BT is successfully matched, the burst receiver is instructed to perform a resetting operation. In this embodiment, the received BT is a sequence with all 0s, or other binary sequences different from the preamble or delimiter.

Step S303: Reset the receiver after successfully matching the BT.

If the BT is successfully matched, it indicates that the burst receiving is finished, and the receiver is reset.

According to the burst receiver resetting method in the PON and the corresponding burst transmission method at an ONU burst transmission end provided in the embodiments of the present invention, the RE does not need to unpack upstream burst bandwidth allocation information carried in downstream data, and does not need to calculate a start time and an end time of an upstream burst according to the upstream bandwidth allocation information. Therefore, the complexity of the implementation of the RE is reduced, and the method is simple and effective.

Figure 6:
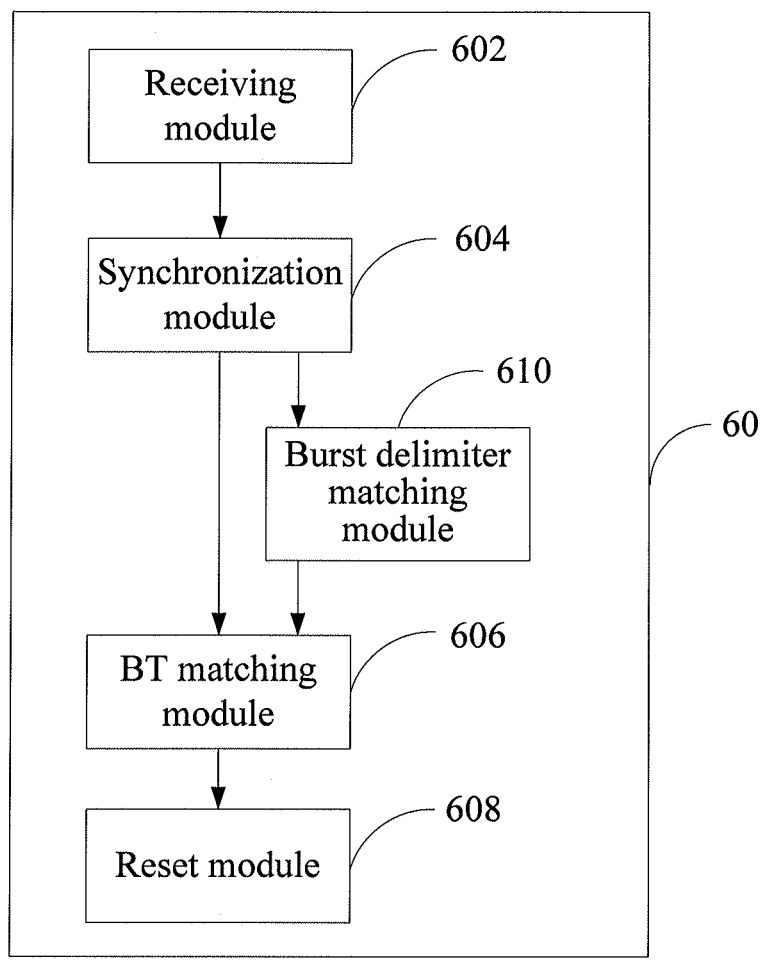
FIG. 6 is a schematic diagram of modules of a burst receiver according to an embodiment of the present invention.

The embodiment of the present invention further provides a burst receiver, as shown in FIG. 6. The burst receiver 60 includes a receiving module 602, a synchronization module 604, a BT matching module 606, a reset module 608, and a burst delimiter matching module 610.

The receiving module 602 is configured to receive burst data, where the burst data includes a preamble sequence, a data payload, and a BT.

The synchronization module 604 is configured to synchronize data according to the received preamble sequence.

The BT matching module 606 is configured to match a BT. An operation for matching the BT may be performed according to specific features of the BT. The BT may either be matched according to a bit shift, or matched based on a shift of a specific length. That is, when a length of the BT is in combination with features of the burst data, for example, data in a GPON uses one byte (8 bits) as a unit, and a value of the length of the BT is a natural number multiple of one byte, the matching may be performed through a shift with one byte as a unit. In this embodiment, the recommended length of the BT uses one byte as a unit, that is, the length of the BT is a natural number multiple of one byte, for example, the length of the BT may be a value such as 64, 96, or 128 bits, and the specific value is a binary sequence with alternating 0 and 1, or a sequence with all 0s. When a Hamming distance between the received data and the BT is smaller than a threshold N, the matching is considered to be successful. The Hamming distance herein refers to the number of positions where bit values are different among all positions of two binary sequences with equal lengths. A value of N is a specific natural number, and may be set according to requirements of a system on matching reliability. For example, the setting of a threshold value may directly influence indexes such as an average time of occurrence of incorrect matching of the BT. In a practical application, the specific value of N may be N=12, N=16, or N=18.

The reset module 608 is configured to reset the receiver after the BT is successfully matched.

The burst delimiter matching module 610 is configured to match the burst delimiter for the received data and determine a start position of a burst. The operation for matching the burst delimiter means to match the received data according to a bit shift. When a Hamming distance between the received data and the delimiter is smaller than a certain threshold M, the matching is considered to be successful. The Hamming distance herein refers to the number of positions where bit values are different among all positions of two binary sequences with equal lengths.

The data synchronization 604 performs bit data synchronization. The preamble sequence is generally formed by three parts: a binary sequence with all 0s, a binary sequence with all 1 s, and a specific mode sequence, or may only include a specific mode sequence. The specific mode sequence herein usually adopts a binary sequence with alternating 0 and 1, and may also adopt other sequences that have benefit for clock recovery or bit synchronization.

By using the burst receiver in the PON according to the embodiments of the present invention, the RE does not need to unpack upstream burst bandwidth allocation information carried in downstream data, and does not need to calculate a start time and an end time of the upstream burst according to the upstream bandwidth allocation information. As a result, the complexity of the implementation of the RE is reduced, and the method is simple and effective.

What is claimed is:

1. A burst receiver resetting method in a Passive Optical Network (PON), the method comprising:
   receiving a preamble sequence and synchronizing data;
   after synchronizing, continuing to receive data, and matching a Burst Terminator (BT); and
   resetting the receiver after successfully matching the BT;
   wherein matching the BT comprises one of:
   matching the BT according to a bit shift or matching the BT based on a shift of a length, wherein when a Hamming distance between the received data and the terminator is smaller than a preset threshold, the matching is successful.

2. The method according to claim 1, wherein after synchronizing the method further comprises:
   matching a burst delimiter for the received data, and determining a start position of a burst;
   wherein the continuing to receive data comprises:
   continuing to receive burst data after successfully matching the burst delimiter.

3. The method according to claim 2, wherein the BT is a binary sequence with alternating 0s and 1s.

4. The method according to claim 1, wherein the BT is a sequence with all 0s.

5. The method according to claim 4, wherein the BT uses one byte as a unit, and a length of the BT is an integral multiple of one byte.

6. The method according to claim 4, wherein when the BT is the sequence with all 0s, the BT is a protection time slot between bursts.

7. A hardware-based burst receiver in a Passive Optical Network (PON), the receiver comprising:
   a receiving module, configured to receive burst data, wherein the burst data comprises a preamble sequence, a data payload, and a Burst Terminator (BT);
   a synchronization module, configured to synchronize data according to the received preamble sequence;
   a BT matching module, configured to match a BT, wherein the BT matching module performs matching according to one of a bit shift or based on a shift of a length, and when a Hamming distance between the received data and the terminator is smaller than a preset threshold, the matching is successful; and
   a reset module, configured to reset the receiver after the BT is successfully matched.

8. The burst receiver according to claim 7, further comprising:
   a burst delimiter matching module, configured to match a burst delimiter for the received burst data and determine a start position of the burst data.

* * * * *